Patented Jan. 27, 1931

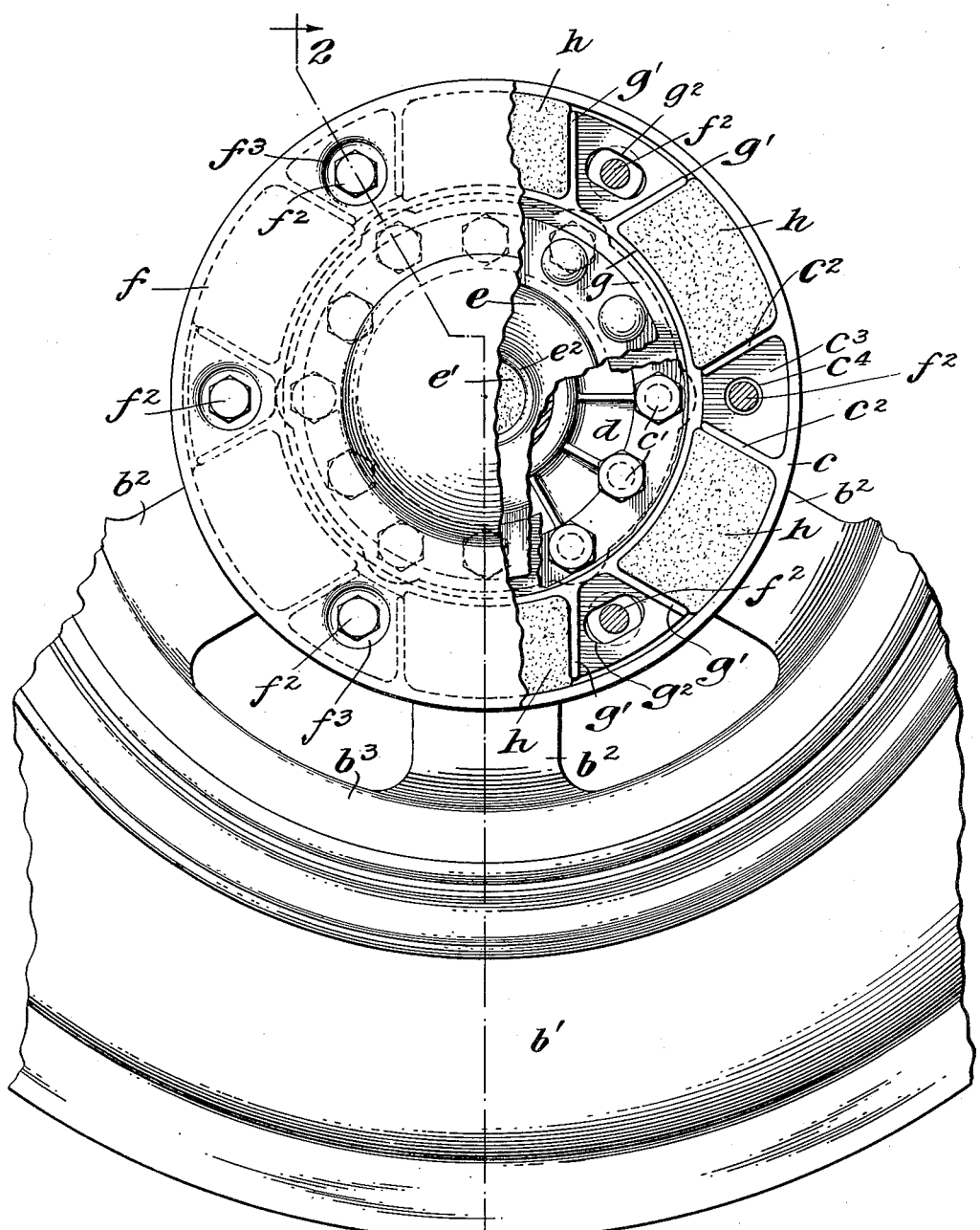

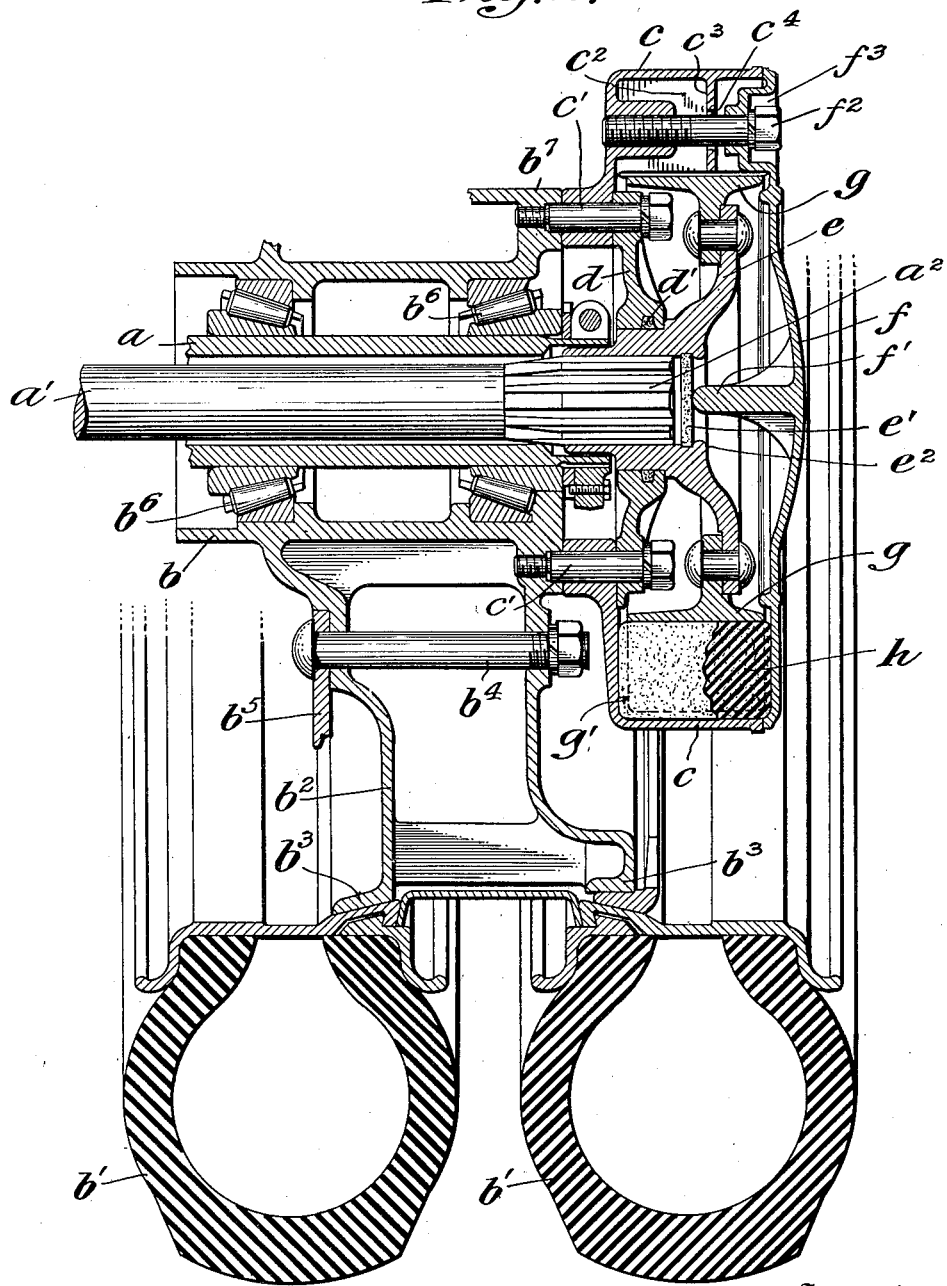

1,790,614

UNITED STATES PATENT OFFICE

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE

WHEEL-TORQUE INSULATOR

Application filed June 12, 1929. Serial No. 370,259.

The present invention relates to torque cushioning devices and embodies, more specifically, an improved form of torque cushioning device which is adapted to be inserted between the axle and wheel of a vehicle.

Devices of a similar nature have been proposed heretofore and constructed in such manner that a new form of wheel is required wherein the torque cushioning elements are incorporated within the structure of the wheel. This obviously prevents the ready interchangeability of parts and, for this reason, has not met with approval.

The present invention provides a form of torque cushioning device which is constructed in such manner that it may be inserted directly between the axle, or jack shaft, and the hub of a standard wheel, thus forming an accessory which is easily applied to wheels which are now in production and use.

An object of the invention, therefore, is to provide a device for cushioning torque and lessening the starting shock between the axle shaft and wheel.

A further object of the invention is to provide a device of the above character which is readily mounted between the wheel hub and jack shaft of the vehicle.

A further object of the invention is to provide a structure of the above character which may be applied directly to standard forms of wheels and affords a cushioning effect upon the torque transmitted between the wheel hub and jack shaft.

Further objects of the invention, not specifically enumerated above, will be apparent as it is described in greater detail in connection with the accompanying drawings, wherein:

Figure 1 is a view in side elevation, partly broken away and in section, showing one form of the invention.

Figure 2 is a view in section, taken on line 2—2 of Figure 1, and looking in the direction of the arrows.

Referring to the above drawings, $a$ designates an axle housing carrying a jack shaft $a'$ having a splined end $a^2$. A wheel hub $b$, here shown as carrying a wheel structure adapted to accommodate a pair of tires $b'$, is formed with spokes $b^2$ and rim $b^3$. Bolts $b^4$ are provided to secure brake drum $b^5$ to the wheel and the construction, thus far, follows a conventional form of wheel now in use. Bearings $b^6$ mount the wheel hub upon the axle housing $a$ in the usual manner.

To the annular boss $b^7$, formed on the outer face of the hub $b$, a housing $c$ is secured. Bolts $c'$ serve to secure the housing $c$ to the wheel hub and also carry an apertured sealing disc $d$, having a sealing ring $d'$.

A spider $e$ is carried by the splined end $a^2$ of the jack shaft $a$ and is provided with a sealing disc $e'$, held in place by shoulder $e^2$. The sealing disc $e'$ is supported by an inwardly projecting portion $f'$ on a cover plate $f$ which is secured to housing $c$ by means of bolts $f^2$.

Carrier $g$ is secured to the spider $e$ at the periphery thereof, and is formed with web extensions $g'$, forming seats for cushioning elements to be described hereinafter. Elongated slots $g^2$ are formed in the carrier $g$ to receive bolts $f^2$, the slots being sufficiently elongated to permit a desired degree of movement between the carrier $g$ and bolts $f^2$.

Extending inwardly from the annular periphery of housing $c$, are web-shaped seats $c^2$ which cooperate with seats $g'$ on the carrier $g$ and alternate with respect thereto. The inwardly projecting reenforcing web $c^3$ is formed between the seats to serve as a reenforcement therefor and provided with an aperture $c^4$ through which the bolts $f^2$ may pass.

The cover plate $f$ is formed with recesses $f^3$ in which the heads of bolts $f^2$ are received and suitable cushioning elements $h$, such as blocks of yielding non-metallic material, are positioned between the respective seats $c^2$ and $g'$.

It will be seen that the spider $e$ and carrier $g$ are mounted to move with the driving axle $a'$. The wheel hub and housing $c$ move with the wheel and receive power from the driving axle through the blocks of yielding non-metallic material $h$. Driving torque is thus cushioned by means of such blocks of yielding non-metallic material and the entire structure is readily applied to, and removed from the standard forms of wheels now in use. While the invention has been described with specific reference to the construction shown in the accompanying drawings, it is obvious that changes in design and arrangement of parts may be made to adapt the invention to use on various forms of wheels without departing from the scope of the invention as defined in the appended claims.

I claim as my invention:

1. In a torque cushioning device adapted to be inserted between an axle and a wheel hub embodying a housing mounted on the wheel hub and a spider mounted on the axle, a carrier on the spider and extending within the housing, means to resist relative rotation of the carrier and housing, and a sealing disc on the housing and engaging the spider to seal the spider and housing from the axle and wheel hub bearing.

2. In a torque cushioning device adapted to be inserted between an axle and a wheel hub embodying a housing mounted on the wheel hub and a spider carried by the axle, a carrier on the spider extending within the housing, pairs of inwardly extending V-shaped webs within the housing, pairs of outwardly extending V-shaped webs on the carrier, and blocks of yielding non-metallic material between adjacent webs of the respective members.

This specification signed this 7th day of June, A. D. 1929.

AUGUST H. LEIPERT.